United States Patent
Luo et al.

(10) Patent No.: US 9,907,065 B2
(45) Date of Patent: Feb. 27, 2018

(54) METHODS AND SYSTEMS FOR UPLINK TRANSMIT DIVERSITY

(71) Applicant: QUALCOMM Incorporated, San Diego, CA (US)

(72) Inventors: Tao Luo, San Diego, CA (US); Wanshi Chen, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/970,478

(22) Filed: Dec. 15, 2015

(65) Prior Publication Data

US 2016/0100387 A1     Apr. 7, 2016

Related U.S. Application Data

(62) Division of application No. 13/029,039, filed on Feb. 16, 2011, now Pat. No. 9,225,413.

(Continued)

(51) Int. Cl.
*H04W 72/04* (2009.01)
*H04B 7/0404* (2017.01)
(Continued)

(52) U.S. Cl.
CPC ........ *H04W 72/042* (2013.01); *H04B 7/0404* (2013.01); *H04B 7/068* (2013.01);
(Continued)

(58) Field of Classification Search
CPC ........ H04B 7/04; H04B 7/0654; H04B 7/068; H04B 7/0697; H04L 1/0007;
(Continued)

(56) References Cited

U.S. PATENT DOCUMENTS

| 2005/0041589 A1 | 2/2005 | Kwon et al. |
| 2008/0247488 A1 | 10/2008 | Li et al. |

(Continued)

FOREIGN PATENT DOCUMENTS

| JP | 2001237780 A | 8/2001 |
| JP | 2009207179 A | 9/2009 |

(Continued)

OTHER PUBLICATIONS

3rd Generation Partnership Project; Technical Specification Group Radio Access Network; Evolved Universal Terrestrial Radio Access (E-UTRA) and Evolved Packet Core (EPC); User Equipment (UE) conformance specification; Part 3: Test Suites (Release 8), 3GPP Standard; 3GPP TS 36.523-3, 3rd Generation Partnership Project (3GPP), Mobile Competence Centre ; 650, Route Des Lucioles ; F-06921 Sophia-Antipolis Cedex ; France, No. V8.1.0, Dec. 14, 2009 (Dec. 14, 2009), pp. 1-70, XP050400837, [retrieved on Dec. 14, 2009] chapter 7.1.

(Continued)

*Primary Examiner* — Stephen J Clawson
(74) *Attorney, Agent, or Firm* — Liem T. Do

(57) ABSTRACT

Certain aspects of the present disclosure propose methods for supporting uplink transmit diversity in a wireless communication system. The proposed methods may eliminate ambiguity in decoding physical downlink control channel aggregation level and resources that are used by different antennas of a user equipment. In addition, a method is proposed for resource allocation for ACK/NACK repetition.

18 Claims, 11 Drawing Sheets

Related U.S. Application Data

(60) Provisional application No. 61/305,486, filed on Feb. 17, 2010.

(51) Int. Cl.

| | | |
|---|---|---|
| *H04B 7/06* | (2006.01) | |
| *H04L 5/00* | (2006.01) | |
| *H04L 27/26* | (2006.01) | |
| *H04L 1/00* | (2006.01) | |
| *H04L 1/18* | (2006.01) | |
| *H04W 72/14* | (2009.01) | |

(52) U.S. Cl.
CPC ......... *H04B 7/0654* (2013.01); *H04B 7/0697* (2013.01); *H04L 1/0046* (2013.01); *H04L 1/0072* (2013.01); *H04L 1/0073* (2013.01); *H04L 5/0053* (2013.01); *H04L 27/2647* (2013.01); *H04W 72/0466* (2013.01); *H04L 1/0007* (2013.01); *H04L 1/1861* (2013.01); *H04W 72/14* (2013.01)

(58) Field of Classification Search
CPC ... H04L 1/0046; H04L 1/0072; H04L 1/0073; H04L 1/1861; H04L 27/2647; H04L 5/0053; H04W 72/042; H04W 72/0466; H04W 72/14
USPC .......................................................... 370/329
See application file for complete search history.

(56) References Cited

U.S. PATENT DOCUMENTS

| | | | | |
|---|---|---|---|---|
| 2009/0257449 | A1* | 10/2009 | Chen ...................... | H04L 1/0041 370/470 |
| 2010/0050059 | A1* | 2/2010 | Cheng ................... | H03M 13/09 714/786 |
| 2012/0044881 | A1 | 2/2012 | Luo et al. | |
| 2012/0051270 | A1* | 3/2012 | Chen ...................... | H04B 7/155 370/279 |
| 2013/0010724 | A1* | 1/2013 | Han ...................... | H04L 5/0007 370/329 |

FOREIGN PATENT DOCUMENTS

| | | |
|---|---|---|
| JP | 2013509836 A | 3/2013 |
| WO | WO-2009082332 A1 | 7/2009 |
| WO | WO 2009124079 A1 | 10/2009 |

OTHER PUBLICATIONS

Ad HOC Chairman (Samsung): "UL MIMO Session Chairman Notes", 3GPP TSG RAN WG1 Meeting No. 59BIS, [Online] No. R1-100814, Jan. 18, 2010 (Jan. 18, 2010),—Jan. 22, 2010 (Jan. 22, 2010), XP002638510, Retrieved from the Internet: URL:http://www.3gpp.org/ftp/tsg_ran/wg1_r1 1/TSGR1_59b/Docs/> [retrieved on May 24, 2011] chapter 7.3.2 PUCCH Tx Diversity.
Huawei: "Further discussion on multiple antenna transmission for PUCCH", 3GPP Draft; R1-093049 Further Discussion on Multiple Antenna Transmission for PUCCH, 3rd Generation Partnership Project (3GPP), Mobile Competence Centre; 650, Route Des Lucioles; F-06921 Sophia-Antipolis Cedex; France, no. Shenzhen, China; Aug. 18, 2009, Aug. 18, 2009 (Aug. 18, 2009), XP050351441, [retrieved on Aug. 18, 2009] paragraphs [0001], [0002].
International Search Report and Written Opinion—PCT/US2011/025342—ISA/EPO—Aug. 3, 2011.
Nokia, Nokia Siemens Networks: "Type-1 Relay Performance for Uplink", 3GPP TSG-RAN WG1, R1-100352, Meeting #59bis, Valencia Spain, Jan. 18-22, 2010.
Nokia: "PDCCH/PCFICH SIMO requirement scenario for alignment simulations", 3GPP Draft; R4-080690, 3rd Generation Partnership Project (3GPP), Mobile Competence Centre; 650, Route Des Lucioles; F-06921 Sophia-Antipolis Cedex; France, vol. RAN WG4, no. Shenzhen, China; Mar. 26, 2008, Mar. 26, 2008 (Mar. 26, 2008), XP050179313, [retrieved on Mar. 26, 2008] the whole document.
QUALCOMM Europe: "Confusing multiple PDCCH aggregation levels" 3GPP Draft; R1-082544, 3rd Generation Partnership Project (3GPP), Mobile Competence Centre; 650, Route Deslucioles; F-06921 Sophia-Antipolis Cedex; France, vol. RAN WG1, no. Warsaw, Poland; Jun. 30, 2008, Jun. 24, 2008 (Jun. 24, 2008), XP050110806.
QUALCOMM Europe: "PUCCH Transmit Diversity", 3GPP Draft; R1-092711 PUCCH TX Diversity, 3rd Generation Partnership Project (3GPP), Mobile Competence Centre; 650, Route Des Lucioles; F-06921 Sophia-Antipolis Cedex; France, no. Los Angeles, USA; Jun. 24, 2009, Jun. 24, 2009 (Jun. 24, 2009), XP050351182, [retrieved on Jun. 24, 2009] paragraph [02.2].
Research in Motion et al: "Resource Mapping for PUCCH format 1/1a/1b with Transmit Diversity", 3GPP Draft; R1-100563 (RIM-PUCCH Resource Mapping for TXD), 3rd Generation Partnership Project (3GPP), Mobile Competence Centr; 650, Route Des Lucioles; F-06921 Sophia-Antipolis Cedex; France, vol. RAN WG1, no. Valencia, Spain; Jan. 18, 2010, Jan. 12, 2010 (Jan. 12, 2010), XP050418181, [retrieved on Jan. 12, 2010] the whole document.
Research in Motion et al., "Transmission Mode Configuration for LTE-A Uplink Transmission", 3GPP Draft, RI-094108(RIM-Trans Mode Config LTE-A), 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 12, 2009 (Oct. 12, 2009), XP050388581.
Taiwan Search Report—TW100105346—TIPO—Aug. 7, 2013.

* cited by examiner

1

METHODS AND SYSTEMS FOR UPLINK TRANSMIT DIVERSITY

CLAIM OF PRIORITY UNDER 35 U.S.C. §119

This application is a division of U.S. patent application Ser. No. 13/029,039, filed Feb. 16, 2011 entitled "METHODS AND SYSTEMS FOR UPLINK TRANSMIT DIVERSITY," which, in turn, claims the benefit of and priority to U.S. Provisional Application No. 61/305,486, entitled, "UPLINK TRANSMIT DIVERSITY FOR ACK/NAK IN LTE-A," filed Feb. 17, 2010, and assigned to the assignee hereof and hereby expressly incorporated by reference herein.

TECHNICAL FIELD

Certain aspects of the present disclosure generally relate to wireless communications and, more particularly, to systems and methods for uplink transmit diversity.

BACKGROUND

The third Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services. LTE-Advanced is an evolving mobile communication standard for providing fourth generation (4G) services. LTE-Advanced also targets faster switching between power states and improved performance at the cell edge.

Physical layer (PHY) of LTE is a highly efficient means of conveying both data and control information between an enhanced base station (eNodeB) and mobile user equipment (UE). LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

SUMMARY

Certain aspects of the present disclosure provide a method for wireless communications. The method includes selecting an aggregation level for use in transmitting a downlink control channel, and transmitting the downlink control channel to an apparatus using the selected aggregation level and one or more metrics dependent on the selected aggregation level and designed to ensure the apparatus decodes the downlink control channel with a proper aggregation level.

Certain aspects of the present disclosure provide a method for wireless communications. The method includes receiving a downlink control channel transmitted using a selected aggregation level and one or more metrics dependent on the selected aggregation level and designed to ensure the downlink control channel is decoded with a proper aggregation level, and determining the selected aggregation level used to transmit the downlink control channel based on successful decoding of the downlink control channel using the one or more metrics dependent on the selected aggregation level.

Certain aspects of the present disclosure provide an apparatus for wireless communications. The apparatus includes means for selecting an aggregation level for use in transmitting a downlink control channel, and means for transmitting the downlink control channel to an apparatus using the selected aggregation level and one or more metrics dependent on the selected aggregation level and designed to ensure the apparatus decodes the downlink control channel with a proper aggregation level.

Certain aspects of the present disclosure provide an apparatus for wireless communications. The apparatus includes means for receiving a downlink control channel transmitted using a selected aggregation level and one or more metrics dependent on the selected aggregation level and designed to ensure the downlink control channel is decoded with a proper aggregation level, and means for determining the selected aggregation level used to transmit the downlink control channel based on successful decoding of the downlink control channel using the one or more metrics dependent on the selected aggregation level.

Certain aspects of the present disclosure provide an apparatus for wireless communications. The apparatus includes at least one processor configured to select an aggregation level for use in transmitting a downlink control channel, and transmit the downlink control channel to an apparatus using the selected aggregation level and one or more metrics dependent on the selected aggregation level and designed to ensure the apparatus decodes the downlink control channel with a proper aggregation level, and a memory coupled to the at least one processor.

Certain aspects of the present disclosure provide an apparatus for wireless communications. The apparatus includes at least one processor configured to receive a downlink control channel transmitted using a selected aggregation level and one or more metrics dependent on the selected aggregation level and designed to ensure the downlink control channel is decoded with a proper aggregation level, and determine the selected aggregation level used to transmit the downlink control channel based on successful decoding of the downlink control channel using the one or more metrics dependent on the selected aggregation level, and a memory coupled to the at least one processor.

Certain aspects provide a computer-program product for wireless communications, comprising a computer-readable medium having instructions stored thereon, the instructions being executable by one or more processors. The instructions include instructions for selecting an aggregation level for use in transmitting a downlink control channel, and instructions for transmitting the downlink control channel to an apparatus using the selected aggregation level and one or more metrics dependent on the selected aggregation level and designed to ensure the apparatus decodes the downlink control channel with a proper aggregation level.

Certain aspects provide a computer-program product for wireless communications, comprising a computer-readable medium having instructions stored thereon, the instructions being executable by one or more processors. The instructions include instructions for receiving a downlink control channel transmitted using a selected aggregation level and one or more metrics dependent on the selected aggregation level and designed to ensure the downlink control channel is decoded with a proper aggregation level, and instructions for determining the selected aggregation level used to transmit the downlink control channel based on successful decoding of the downlink control channel using the one or more metrics dependent on the selected aggregation level.

DETAILED DESCRIPTION

Figure 1:
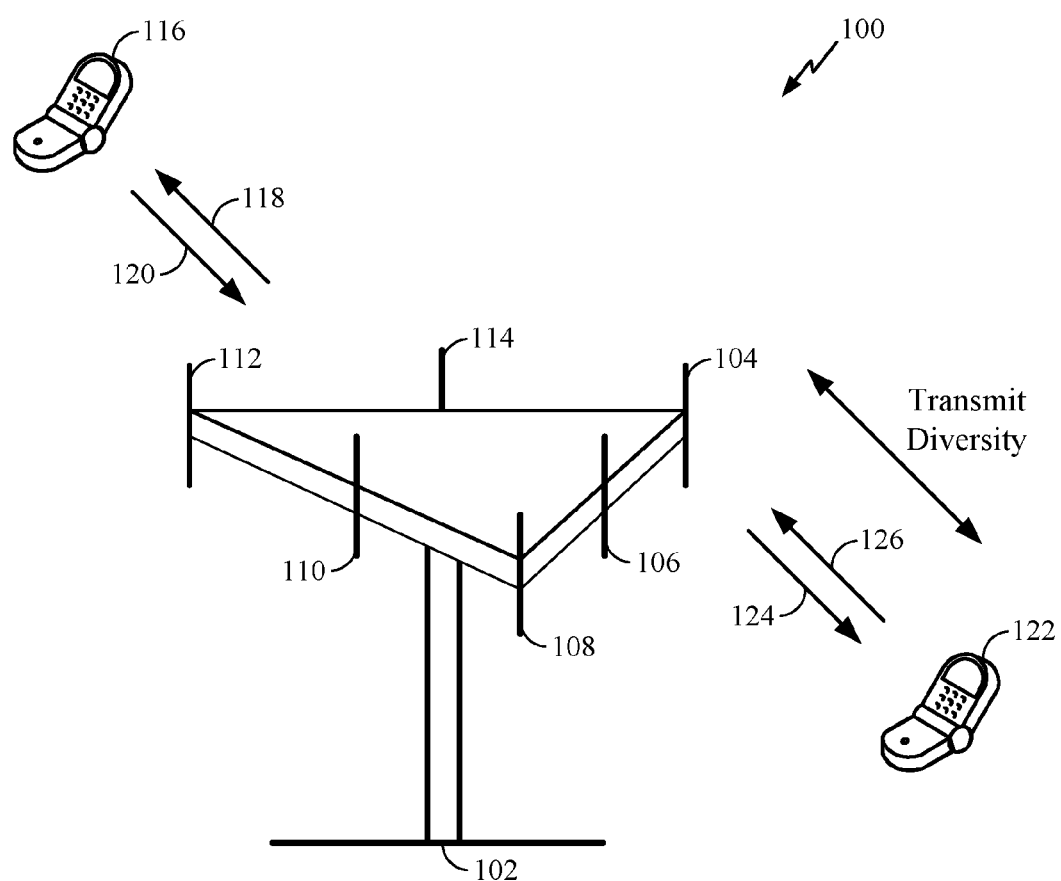
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). For clarity, certain aspects of the techniques are described below for LTE, and LTE terminology is used in much of the description below. It should be noted that the LTE terminology is used by way of illustration and the scope of the disclosure is not limited to LTE.

Single carrier frequency division multiple access (SC-FDMA) utilizes single carrier modulation and frequency domain equalization. The SC-FDMA signal may have lower peak-to-average power ratio (PAPR) because of its inherent single carrier structure. SC-FDMA is used for uplink multiple access scheme in 3GPP LTE where lower PAPR greatly benefits the mobile terminal in terms of transmit power efficiency.

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use a different frequency for communication. For example, forward link 120 may use a different frequency than that used by reverse link 118. Alternatively, it is understood that the system may operate as a Time Division Duplex (TDD) system where the forward and reverse links use a same frequency.

Each group of antennas and/or the area in which they are designed to communicate is often referred to as a sector of the access point. In an aspect, antenna groups each are designed to communicate to access terminals in a sector of the areas covered by access point 102. For certain aspects, the access terminals 116, 122 may utilize uplink transmit diversity using one or more transmit antennas, as described in further detail below.

In communication over forward links 120 and 126, the transmitting antennas of access point 102 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology.

Figure 2:
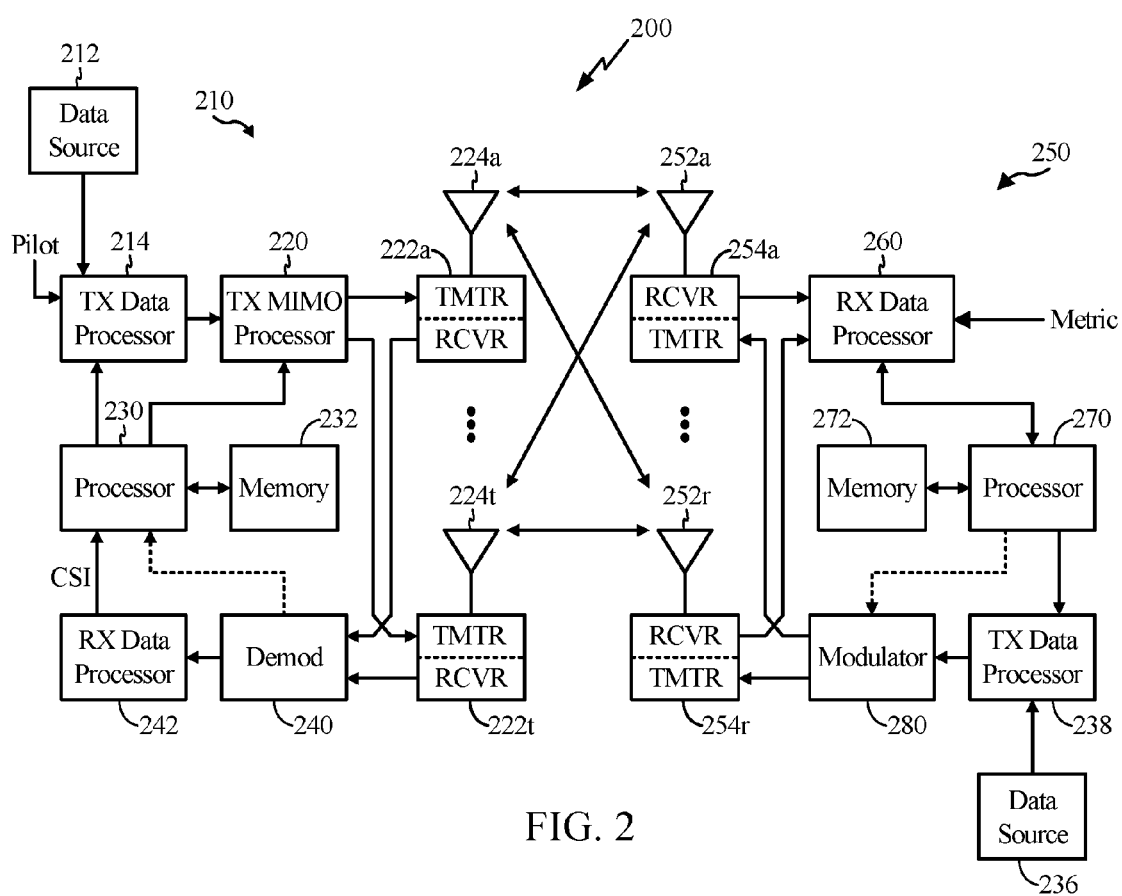
FIG. 2 illustrates a block diagram of a communication system, in accordance with certain aspects of the present disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled to a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At the transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. As described in further detail below, the RX data processor 242 may determine transmission parameters used by the receiver system 250 (e.g., aggregation level, control channel resources) to eliminate decoding ambiguity.

Figure 3:
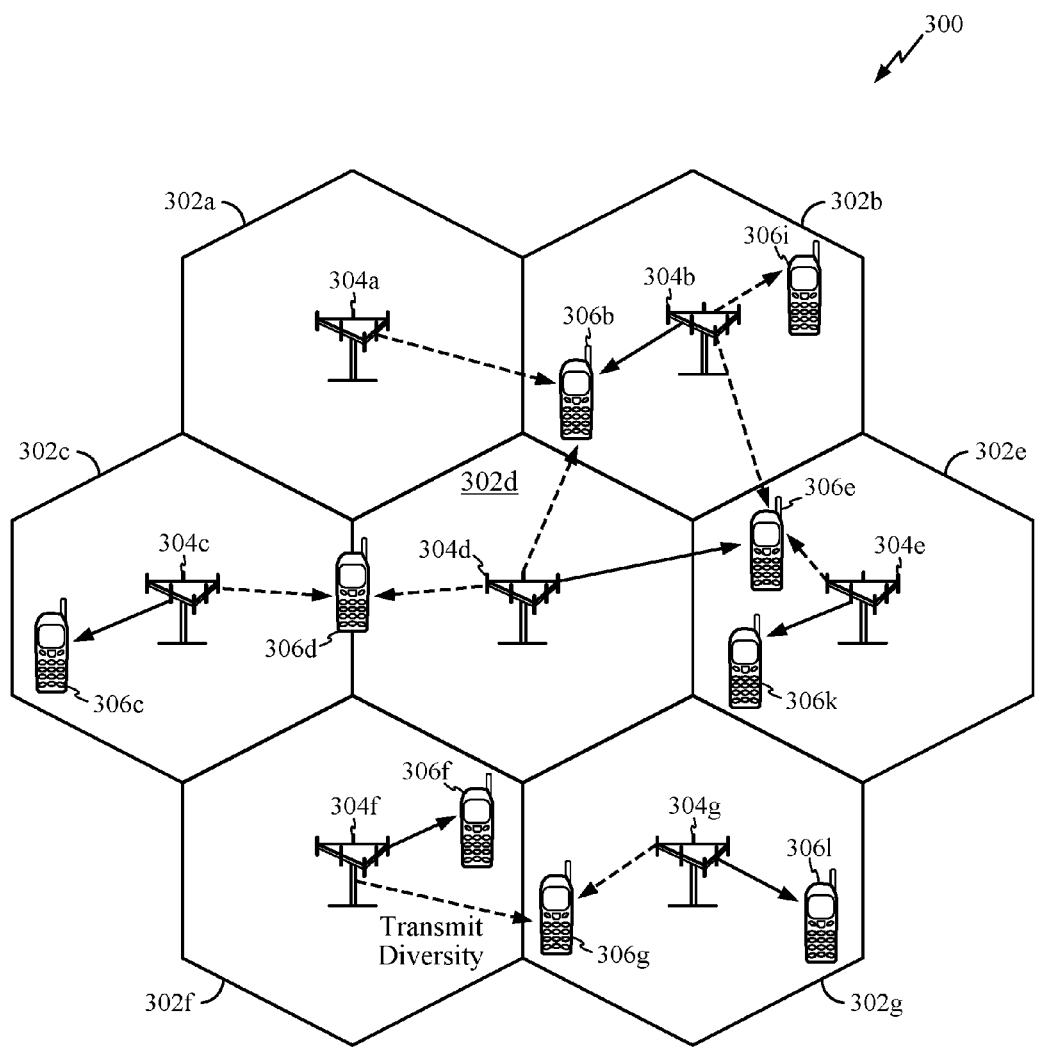
FIG. 3 illustrates a wireless communication system, in accordance with certain aspects of the present disclosure.

FIG. 3 illustrates an example wireless communication system 300 configured to support a number of users, in which various disclosed aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various UEs 306, including UEs 306b-306j, are dispersed throughout the system.

Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, and macro cells 302a-302g may cover a small geographic area.

Certain aspects of the present disclosure propose methods for supporting uplink transmit diversity in a wireless communication system. The proposed methods eliminate ambiguity in decoding physical downlink control channel (PDCCH) aggregation level and resources that are used by different antennas of a UE. In addition, a method is proposed for resource allocation for ACK/NAK repetition.

Figure 4:
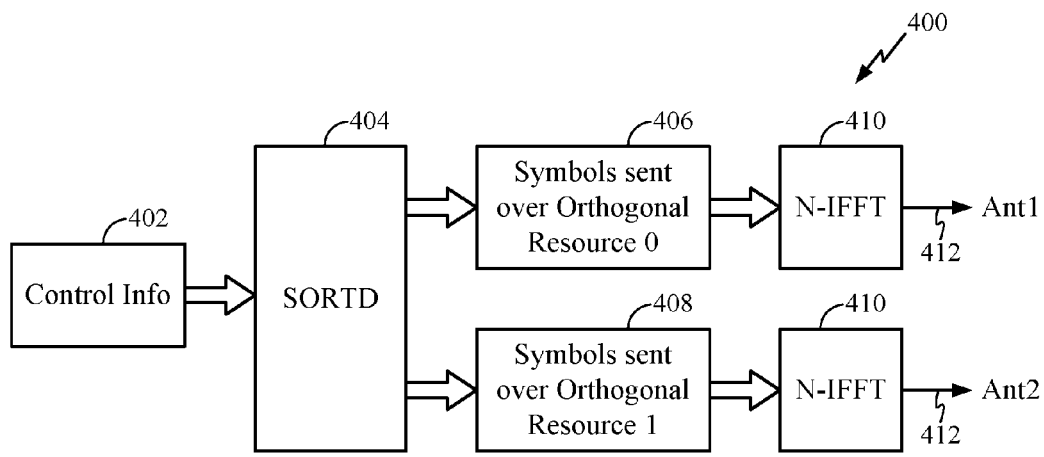
FIG. 4 illustrates a block diagram of a user equipment utilizing transmit diversity, in accordance with certain aspects of the present disclosure.

In a wireless communication system, a UE may be equipped with two or more (possibly virtual) uplink (UL) antennas, therefore, uplink transmit diversity may be possible. FIG. 4 illustrates an example block diagram 400 of a UE utilizing transmit diversity with two antennas. Although two antennas are shown in this example, it should be noted that the UE may have any number of antennas. As illustrated, control information 402 (e.g., symbols) may enter a Spatial Orthogonal Resource Transmit Diversity (SORTD) block 404. The symbols may then be sent over two sets of orthogonal resources (e.g., orthogonal resource0 406 and orthogonal resource1 408). Next, the symbols may pass through N-tap inverse fast Fourier transform (N-IFFT) blocks 410 before being transmitted by the antennas 412. Although not shown in the figure, the UE may have more than two antennas, each of which transmitting over orthogonal resources.

For uplink transmit diversity (TxD), SORTD may be applied to physical uplink control channel (PUCCH) messages (e.g., having formats 1/1a/1b in the LTE standard). A modulated symbol may be transmitted on different orthogonal resources for different antennas. As illustrated in FIG. 4, a UE may transmit the same control information from different transmit antennas utilizing different orthogonal resources including cyclic and orthogonal covers.

The resources used for transmission of acknowledgement (ACK)/negative acknowledgement (NAK) in PUCCH for dynamic scheduling may be derived based on a starting point of the control channel element (CCE) of the physical downlink control channel (PDCCH) in the dynamic assignment and a higher layer configurable offset. The starting CCE of PDCCH for a UE may be random which may depend on the search space (e.g., common among a plurality of UEs, or specific to each UE). The higher layer configurable offset may be cell-specific.

For a UE-specific search space, the starting CCE may depend on the UE identification (ID), subframe index (subframes ranging from 0 to 9), PDCCH aggregation level, and a random seed. There may be four possible aggregation levels such as 1, 2, 4 and 8 that may include up to 6, 6, 2 and 2 decoding candidates, respectively. In addition, the search space for each aggregation level may be contiguous, and search spaces for different aggregation levels may overlap.

Figure 5:
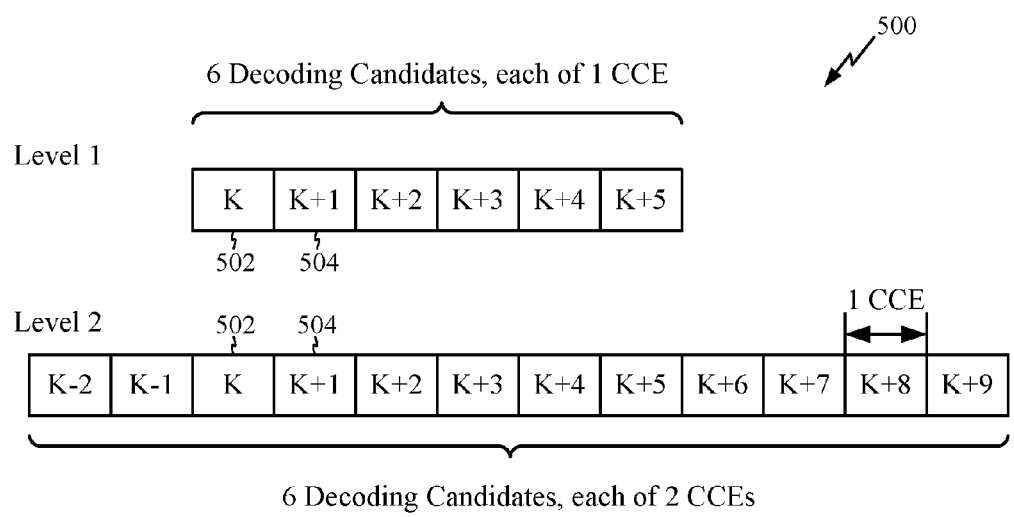
FIG. 5 illustrates resource usage in different aggregation levels, in accordance with certain aspects of the present disclosure.

FIG. 5 illustrates an example resource usage 500 comprising overlapping search spaces for different aggregation levels. As illustrated, Level 1 and Level 2 for a UE have overlapping search spaces. Level 1 includes $CCE_K$ 502 through $CCE_{K+5}$ while Level 2 includes $CCE_{K-2}$ through $CCE_{K+9}$. If PDCCH uses $CCE_K$ 502 and $CCE_{K+1}$ 504 of Level 2, depending on the PDCCH payload sizes and channel conditions, the UE may have two options for decoding the PDCCH. The first option being the $CCE_K$ and $CCE_{K+1}$, of Level 2, and the second option being $CCE_K$ or $CCE_{K+1}$ of Level 1. Having two different decoding options may result in ambiguous decoding.

For single antenna port operation, ACK/NAK resources may be derived based on the starting index of the CCEs (e.g., K). Therefore, there may not be any ambiguity from the perspective of the eNB. However, for SORTD, the eNB may not know whether the UE decodes Level 1 or Level 2, which may cause ambiguity depending how the second resource is derived and whether SORTD is applied for all aggregation levels.

Generally, search space ambiguity may occur between Level 1 and Levels 2, 4 and 8. Search space ambiguity may also occur between combinations of levels {2, 4, 8} if inconsistent derivation of second PUCCH resource is applied. When ambiguity occurs, an eNB may perform blind decoding to determine the aggregation level and the corresponding resource. In addition, there may be collisions in ACK/NAK transmissions between UEs in the same cell. For example, another UE may be scheduled using the ambiguous CCE as the input to its PUCCH ACK/NAK resource derivation, which may transmit ACK/NAK using the same resource as the UE in ambiguity. As a result, collision may occur. Such collisions may impact downlink (DL) performance, and may undermine the benefits of transmit diversity.

For certain aspects of the present disclosure, a consistent transmit diversity scheme along with consistent derivation of resources for used for different antennas may be used to eliminate resource ambiguity. For example, consistent transmission diversity (TxD) schemes may be enforced for all of the aggregation levels. In addition, consistent derivation of the second ACK/NAK resource (e.g., to be used by the second antenna) may be used for all aggregation levels. Therefore, SORTD may be applied to all aggregation levels such as 1, 2, 4 and 8.

For certain aspects, consecutive resources may be utilized for two or more antennas. For example, the first antenna may use $n_{CCE}$, which may be the starting CCE of the scheduling PDCCH and the second antenna may use the next CCE (e.g., $n_{CCE}+1$). Therefore, the two antennas may utilize consecutive control channel resources.

For another aspect, the second resource (e.g., $n_{CCE'}$) may be configured through layer 3 (e.g., radio resource control (RRC)) signaling. For PDCCH with level 1, the resources that are assigned to the second antenna (e.g., $n_{CCE}+1$ or $n_{CCE'}$) may not be used for another DL scheduling. However, these resources may be used for UL scheduling. It should be noted that the proposed ideas may easily be applied to transmit diversity schemes utilizing more than two antennas.

For certain aspects of the present disclosure, to eliminate decoding ambiguity, the UE may explicitly be informed about the aggregation level in PDCCH. For example, one or more bits may be used to differentiate between level 1 and other levels (e.g., levels 2, 4, and 8), or to indicate a level implicitly. In addition, SORTD may be applied to all aggregation levels. In this case, for level 1, the second resource may be configured by Layer 3, or a resource other than $n_{CCE}+1$ (otherwise, such an explicit bit may not be necessary). Another solution may be to apply SORTD only to levels 2, 4, and 8, while level 1 uses one antenna port. However, this method may require a new downlink control information (DCI) format.

For certain aspects, physical layer may be changed to ensure non-ambiguous aggregation level decoding in PDCCH. For example, starting index for rate matching may depend on the aggregation level, as illustrated in FIG. 6.

Figure 6:
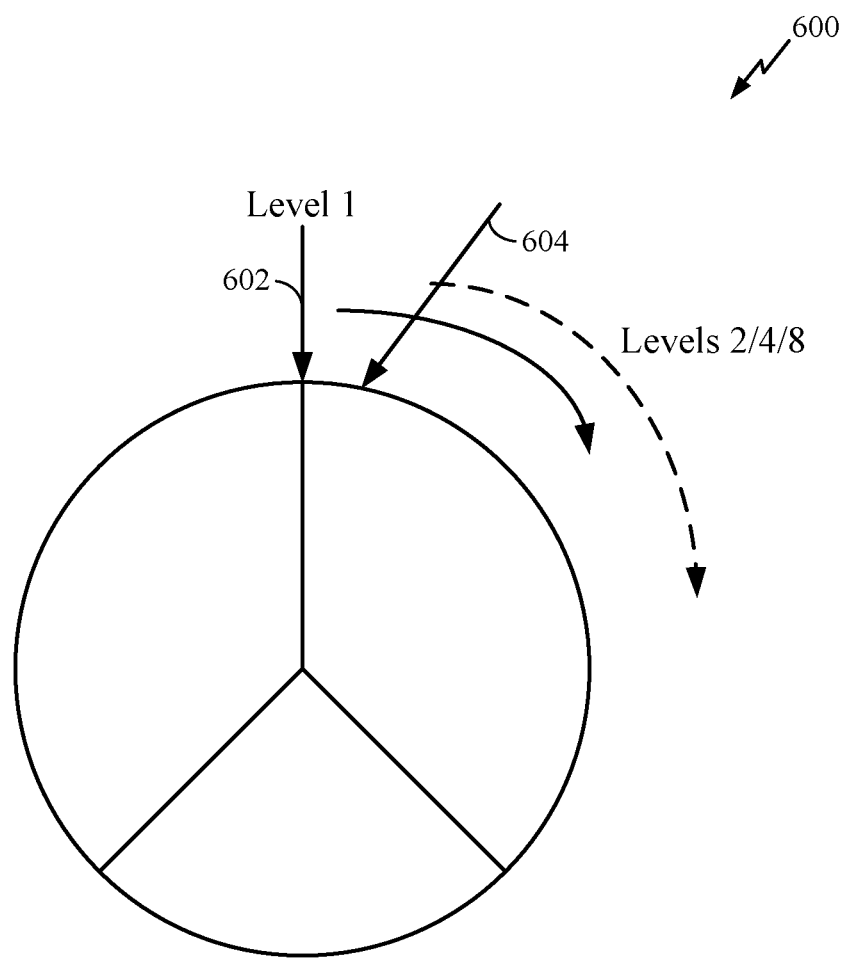
FIG. 6 illustrates aggregation level dependent starting index, in accordance with certain aspects of the present disclosure.

FIG. 6 illustrates an example diagram 600 with aggregation level-dependent starting index, in accordance with certain aspects of the present disclosure. As illustrated, two different starting indices may be defined, one for level 1 (602), and one for the other levels (604) such as levels 2, 4, and 8. In a different example, four starting indices may be defined to differentiate the four levels. The changes in the physical layer may be achieved by modifying the definition of bit collection, selection and transmission in the LTE standard.

For certain aspects, aggregation-dependent scrambling code may be used to eliminate decoding ambiguity. Therefore, for different aggregation levels, a different scrambling code may be applied to the symbols. For certain aspects, cyclic redundancy check (CRC) masking may also be aggregation-dependent to eliminate decoding ambiguity. Therefore, the CRC bits may be scrambled by a sequence which may be determined based on the aggregation level. It should be noted that this method may impose changes in the physical layer.

Figure 7:
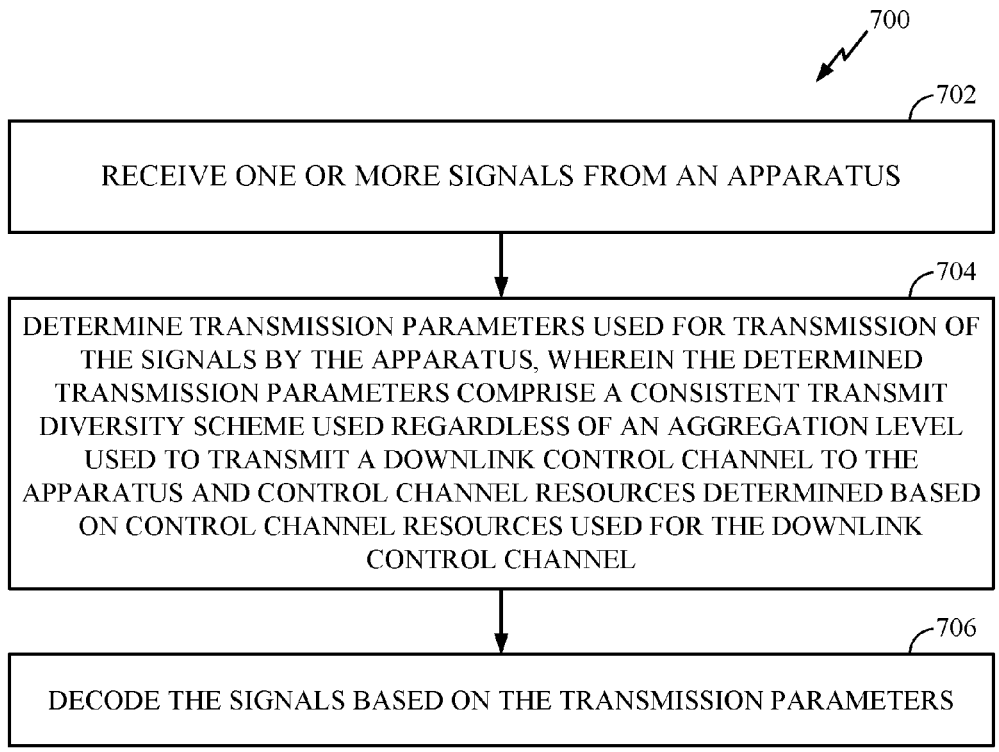
FIG. 7 illustrates operations that may be performed by an access point to eliminate decoding ambiguity in transmit diversity, in accordance with certain aspects of the present disclosure.

FIG. 7 illustrates example operations 700 that may be performed by an access point (e.g., eNB) to eliminate decoding ambiguity in transmit diversity, in accordance with certain aspects of the present disclosure. At 702, an eNB receives one or more signals from an apparatus (e.g., a UE). At 704, the eNB determines transmission parameters used for transmission of the signals by the apparatus, wherein the determined transmission parameters comprise a consistent transmit diversity scheme used regardless of an aggregation level used to transmit a downlink control channel to the apparatus and control channel resources determined based on control channel resources used for the downlink control channel. At 706, the eNB decodes the signals based on the transmission parameters. It should be noted that the control channel resources may be used to receive acknowledgement messages.

Figure 7A:
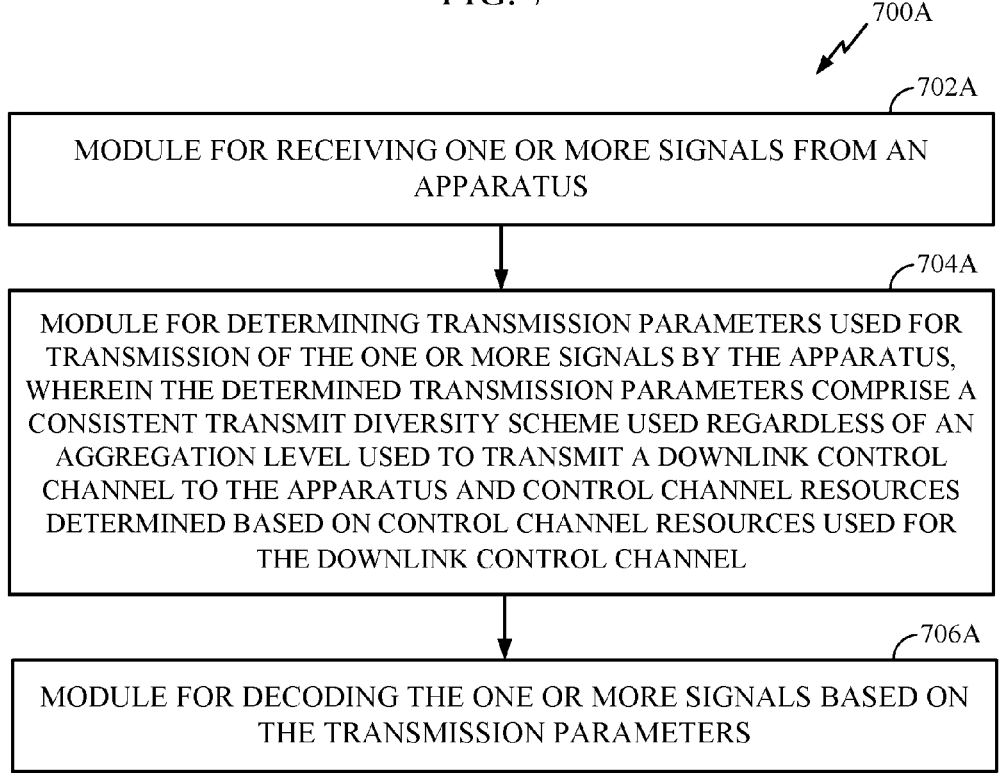
FIG. 7A illustrates components capable of performing the operations illustrated in FIG. 7.

FIG. 7A illustrates a block diagram of components 700A for performing the operations 700 of FIG. 7. The components 700A include a module 702A for receiving one or more signals from an apparatus (e.g., a UE). The components 700A further include a module 704A for determining transmission parameters used for transmission of the signals by the apparatus, wherein the determined transmission parameters comprise a consistent transmit diversity scheme used regardless of an aggregation level used to transmit a downlink control channel to the apparatus and control channel resources determined based on control channel resources used for the downlink control channel. The components 700A further include a module 706A for decoding signals based on the transmission parameters. In some designs, the control channel resources may be used to receive acknowledgement messages.

Figure 8:
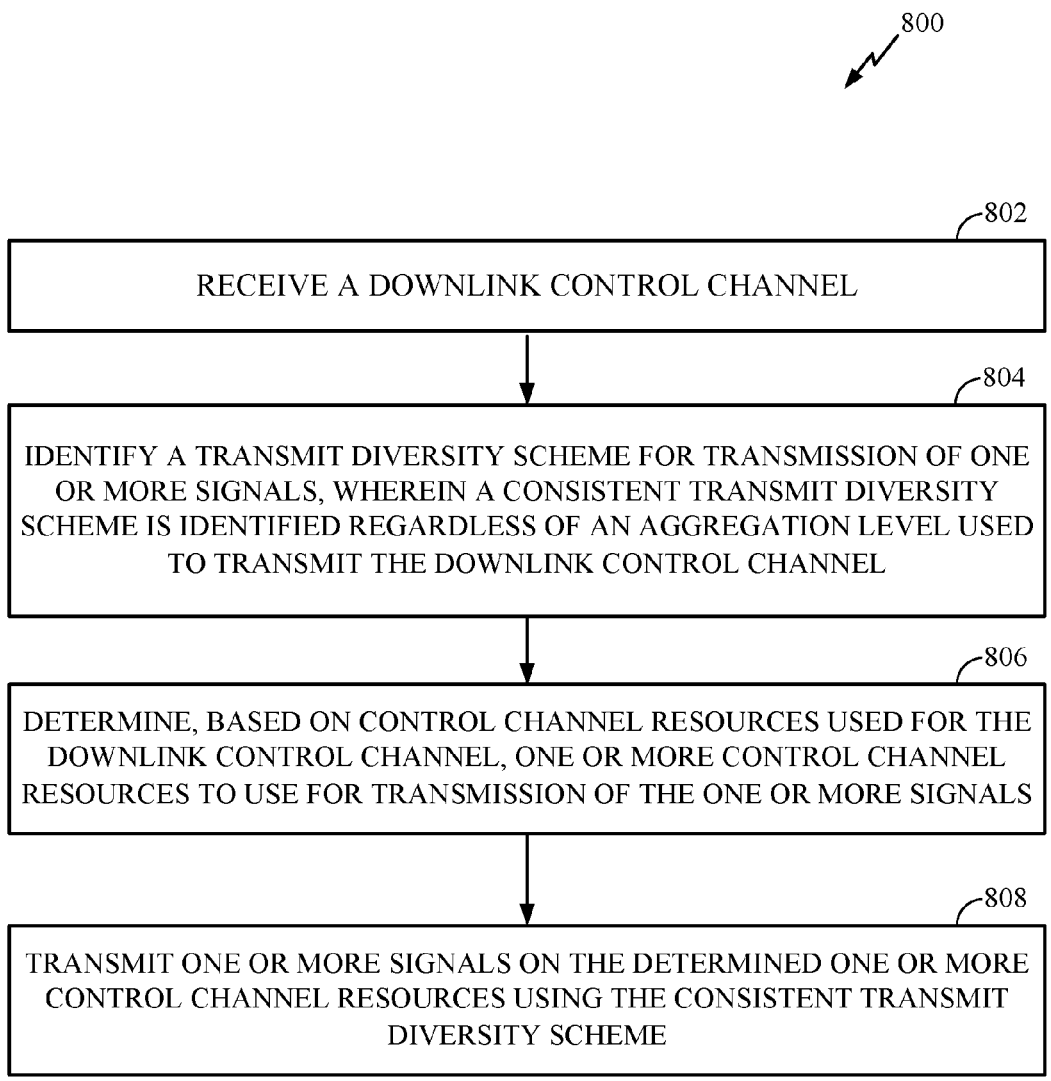
FIG. 8 illustrates operations that may be performed by a user equipment to eliminate decoding ambiguity in transmit diversity, in accordance with certain aspects of the present disclosure.

FIG. 8 illustrates example operations 800 that may be performed by a UE to eliminate decoding ambiguity in transmit diversity, in accordance with certain aspects of the present disclosure. At 802, the UE receives a downlink control channel. At 804, the UE identifies a transmit diversity scheme for transmission of one or more signals, wherein a consistent transmit diversity scheme is identified regardless of an aggregation level used to transmit the downlink control channel. At 806, the UE determining, based on control channel resources used for the downlink control channel, one or more control channel resources to use for transmission of the one or more signals. At 808, the UE transmits one or more signals on the determined one or more control channel resources using the consistent transmit diversity scheme.

Figure 8A:
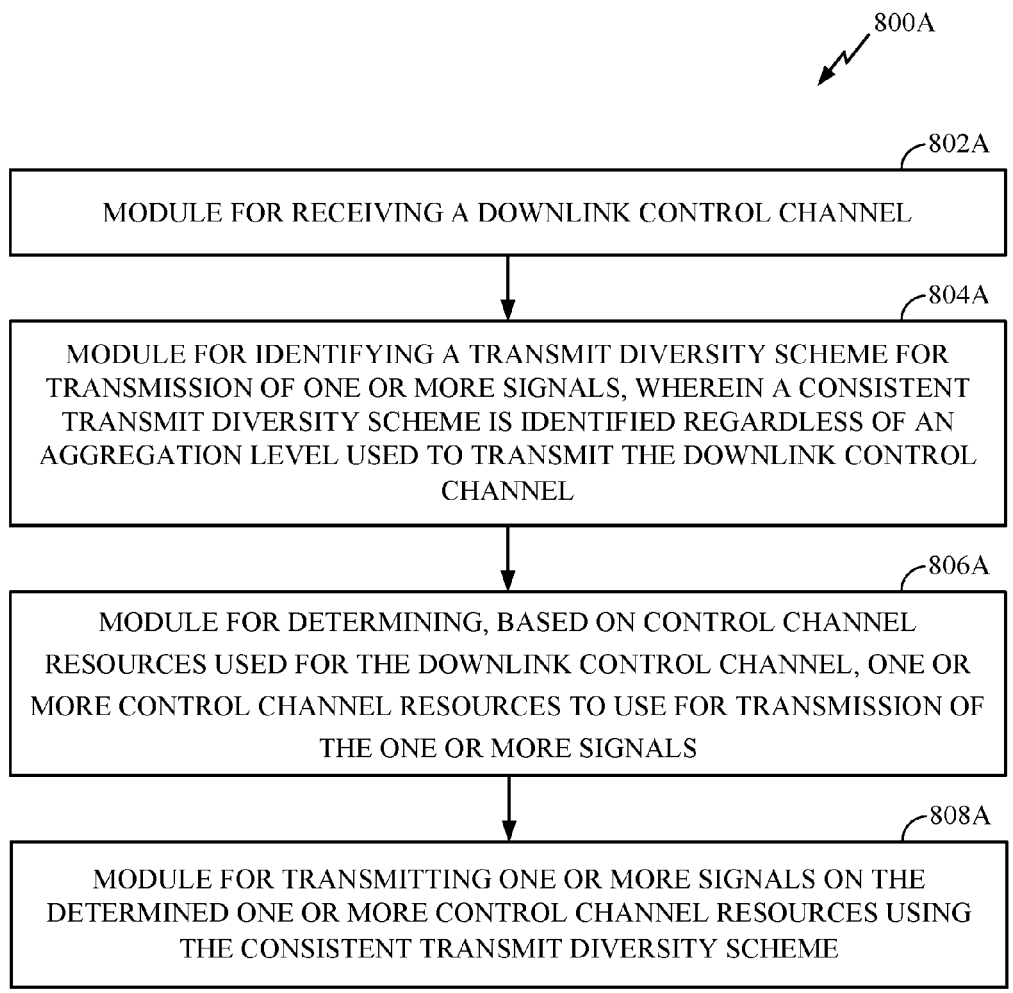
FIG. 8A illustrates components capable of performing the operations illustrated in FIG. 8.

FIG. 8A illustrates a block diagram of components 800A for performing the operations 800 of FIG. 8. The components 800A include a module 802A for receiving a downlink control channel. The components 800A further include a module 804A for identifying a transmit diversity scheme for transmission of one or more signals, wherein a consistent transmit diversity scheme is identified regardless of an aggregation level used to transmit the downlink control channel. The components 800A further include a module 806A for determining, based on control channel resources used for the downlink control channel, one or more control channel resources to use for transmission of the one or more signals. The components 800A further include a module 808A for transmitting one or more signals on the determined one or more control channel resources using the consistent transmit diversity scheme.

Figure 9:
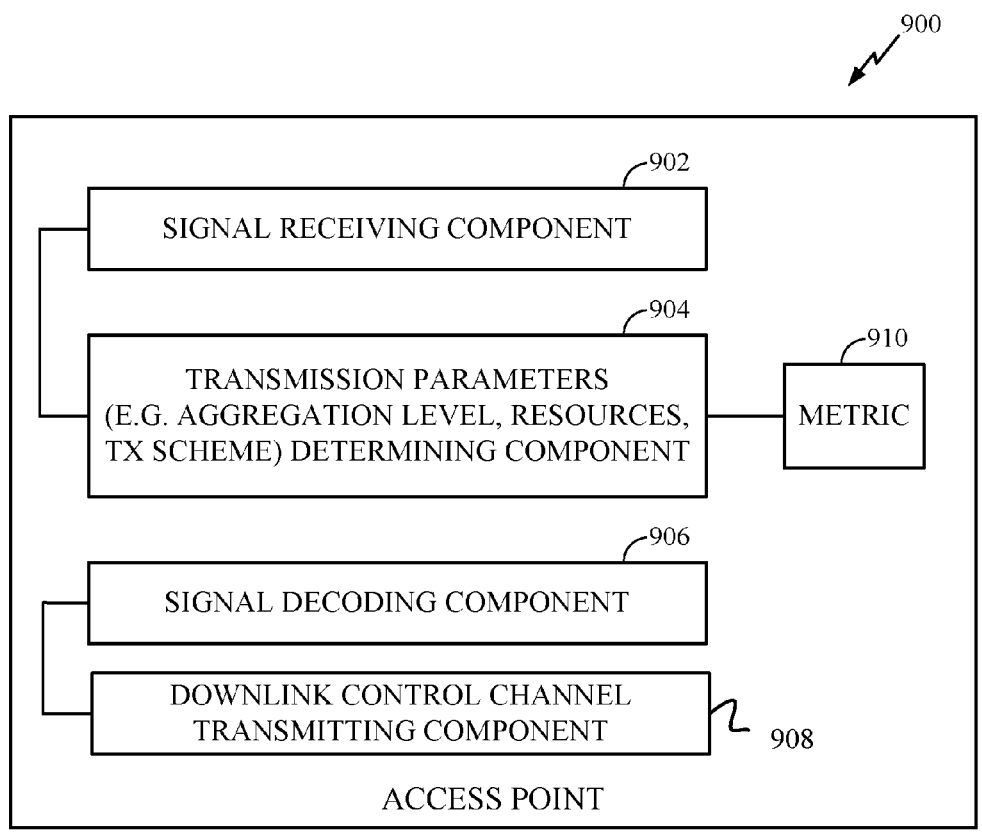
FIG. 9 illustrates a functional block diagram of an access point that may be capable of eliminating decoding ambiguity in transmit diversity, in accordance with certain aspects of the present disclosure.

FIG. 9 illustrates a functional block diagram 900 of an access point (e.g., eNB), in accordance with certain aspects of the present disclosure. As illustrated, an eNB may comprise a message receiving component 902 for receiving a message from a UE. The eNB may also comprise a transmission parameter (e.g., aggregation level, control channel resources, transmission scheme) determining component 904 for determining the transmission parameters of the message based on one or more metrics 910. The eNB may also comprise a message decoding component 906, and a downlink control channel transmitting component 908.

Figure 10:
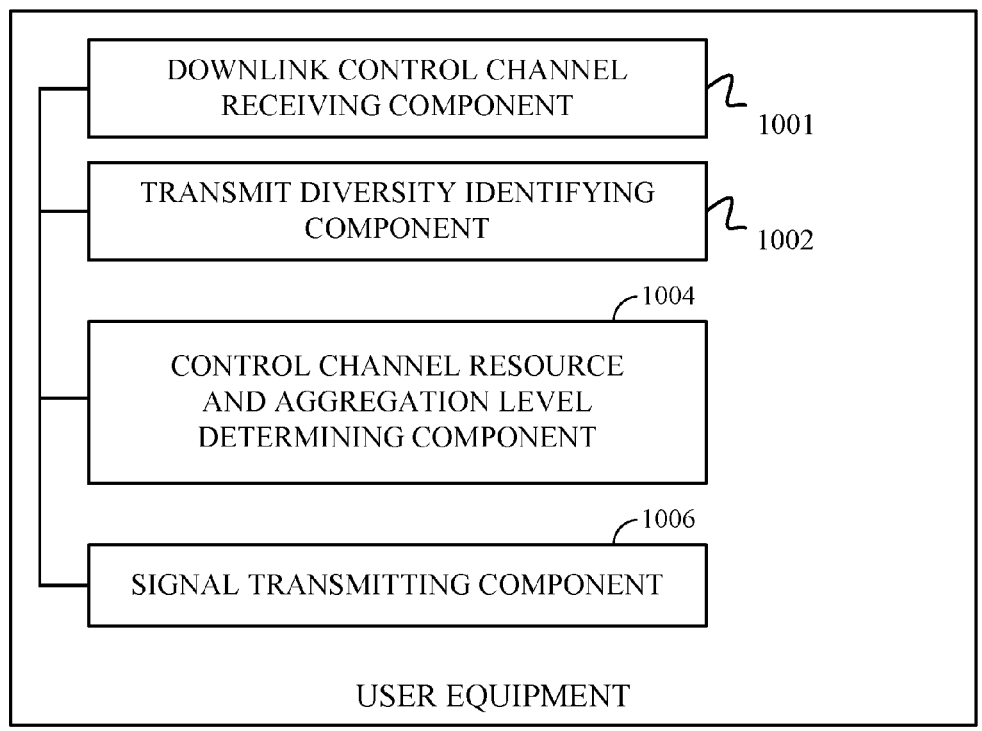
FIG. 10 illustrates a functional block diagram of a user equipment, in accordance with certain aspects of the present disclosure.

FIG. 10 illustrates a functional block diagram 1000 of a UE, in accordance with certain aspects of the present disclosure. As illustrated, the UE may include a downlink control channel receiving component 1001, a transmit diversity identifying component 1002, a control channel element selecting component 1004 and a signal transmitting component 1006. These components may be utilized to determine transmit parameters and send a message to the eNB using the determined parameters.

Figure 11:
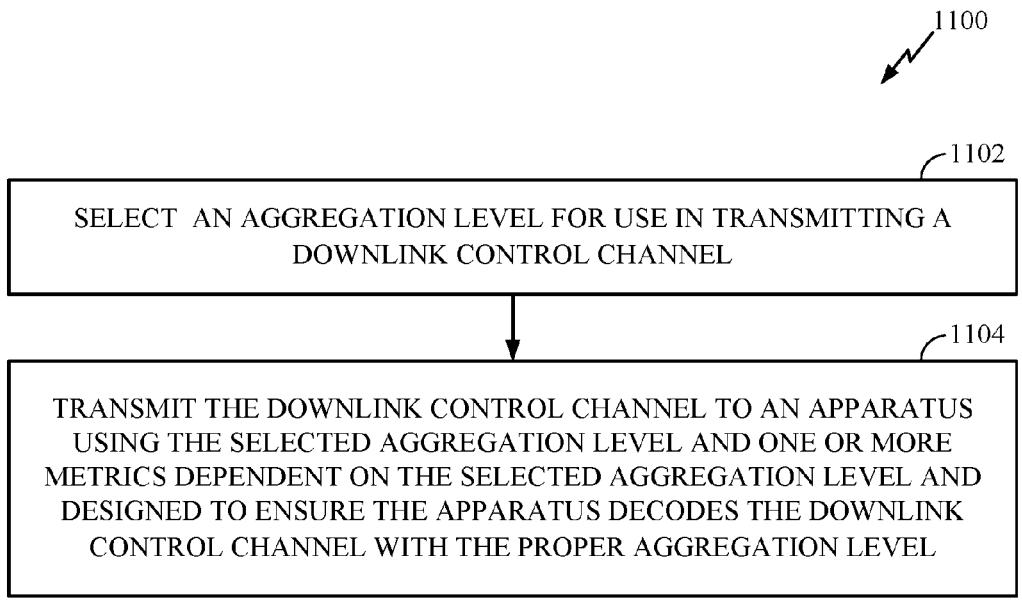
FIG. 11 illustrates other operations that may be performed by an access point to eliminate decoding ambiguity in transmit diversity, in accordance with certain aspects of the present disclosure.

FIG. 11 illustrates another example operations 1100 that may be performed by an access point (e.g., eNB) to eliminate decoding ambiguity in transmit diversity, in accordance with certain aspects of the present disclosure. At 1102, an eNB selects an aggregation level for use in transmitting a downlink control channel. At 1104, the eNB transmits the downlink control channel to an apparatus using the selected aggregation level and one or more metrics dependent on the selected aggregation level and designed to ensure the apparatus decodes the downlink control channel with the proper aggregation level. The one or more metrics may be starting indices for rate matching for the aggregation levels, or one or more scrambling codes used for different aggregation levels (e.g., aggregation level dependent scrambling code), or one or more CRC masking for different aggregation levels (e.g., aggregation level dependent sequence). The one or more metrics may also be based on the starting point of a CCE of downlink scheduling.

Figure 11A:
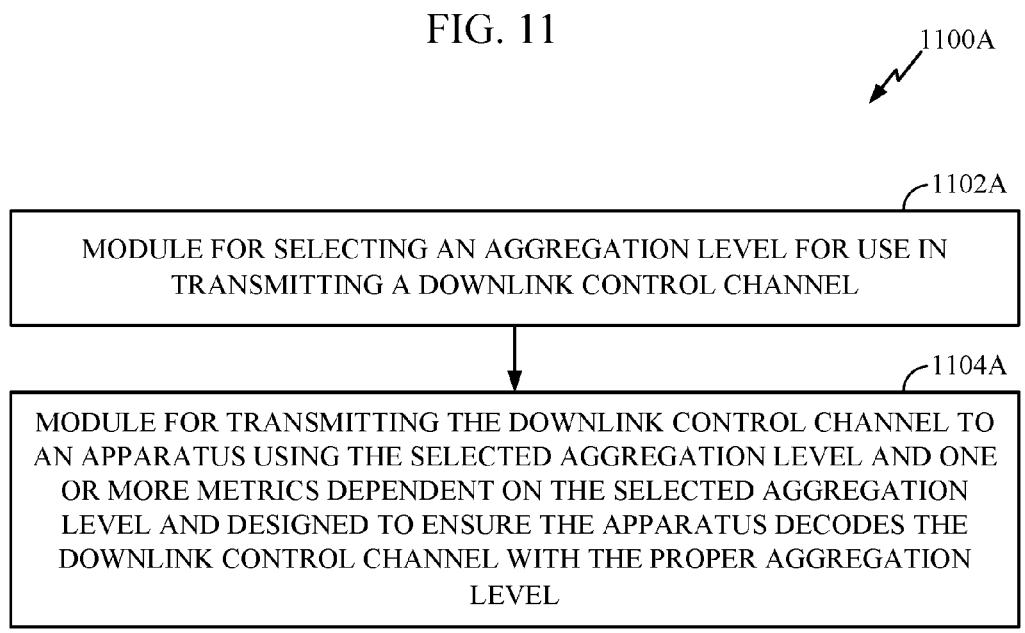
FIG. 11A illustrates components capable of performing the operations illustrated in FIG. 11.

FIG. 11A illustrates a block diagram of components 1100A for performing the operations 1100 of FIG. 11. The components 1100A include a module 1102A for selecting an aggregation level for use in transmitting a downlink control channel. The components 1100A further include a module 1104A for transmitting the downlink control channel to an apparatus using the selected aggregation level and one or more metrics dependent on the selected aggregation level and designed to ensure the apparatus decodes the downlink control channel with the proper aggregation level. The one or more metrics may be starting indices for rate matching for the aggregation levels, or one or more scrambling codes used for different aggregation levels (e.g., aggregation level dependent scrambling code), or one or more CRC masking for different aggregation levels (e.g., aggregation level dependent sequence). The one or more metrics may also be based on the starting point of a CCE of downlink scheduling.

Figure 12:
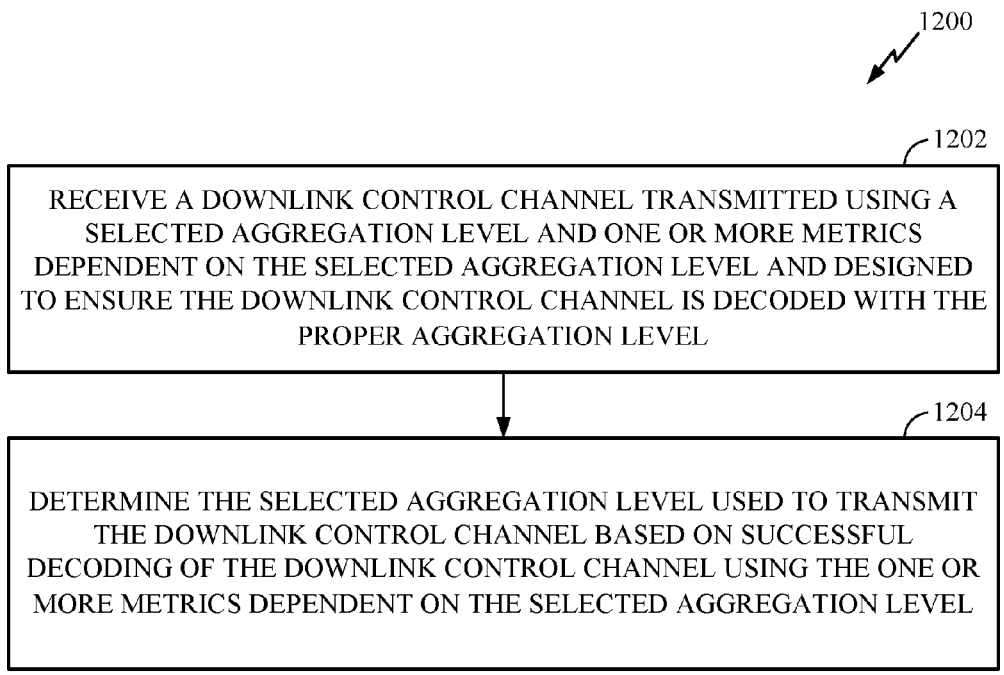
FIG. 12 illustrates other operations that may be performed by a user equipment to eliminate decoding ambiguity in transmit diversity, in accordance with certain aspects of the present disclosure.

FIG. 12 illustrates another example operations 1200 that may be performed by a UE to eliminate decoding ambiguity in transmit diversity, in accordance with certain aspects of the present disclosure. At 1202, the UE receives a downlink control channel transmitted using a selected aggregation level and one or more metrics dependent on the selected aggregation level and designed to ensure the downlink control channel is decoded with the proper aggregation level. At 1204, the UE determines the selected aggregation level that was used to transmit the downlink control channel based on successful decoding of the downlink control channel using the one or more metrics dependent on the selected aggregation level.

Figure 12A:
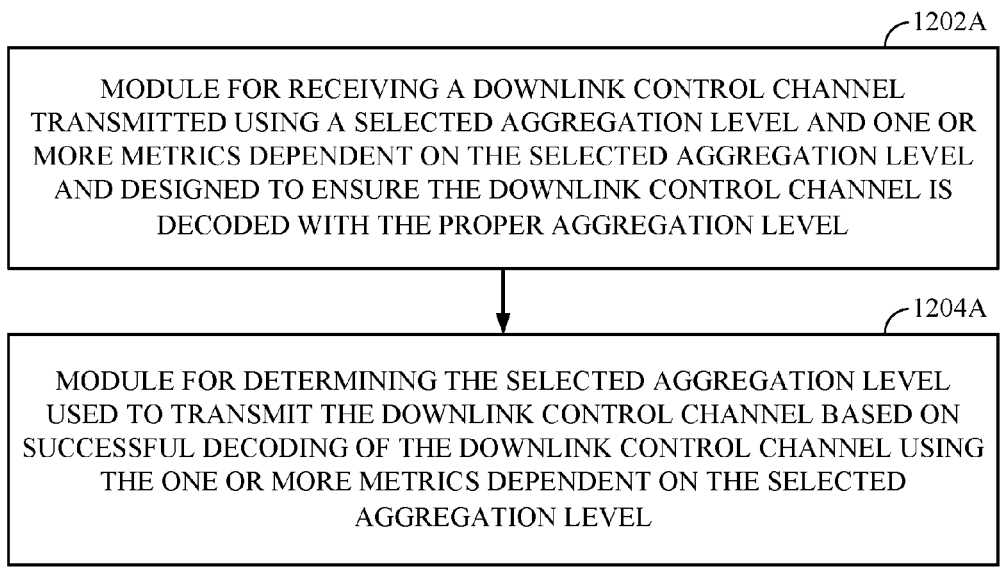
FIG. 12A illustrates components capable of performing the operations illustrated in FIG. 12.

FIG. 12A illustrates a block diagram of components 1200A for performing the operations 1200 of FIG. 12. The components 1200A include a module 1202A for, receives a downlink control channel transmitted using a selected aggregation level and one or more metrics dependent on the selected aggregation level and designed to ensure the downlink control channel is decoded with the proper aggregation level. The components 1200A further include a module 1204A for determining the selected aggregation level that was used to transmit the downlink control channel based on successful decoding of the downlink control channel using the one or more metrics dependent on the selected aggregation level.

Certain aspects may alleviate ambiguity instead of eliminating it. For example, in case of successfully decoding PDCCH with multiple aggregation levels, the UE may always pick the largest (or smallest) level to determine ACK/NAK resource and transmission scheme. For certain aspects, the eNB may perform blind decoding over the ambiguous levels. For certain aspects, the eNB may try to avoid scheduling another DL PDCCH using the ambiguous CCEs.

For certain aspects, Layer 3 configuration of the second resource may be used for SORTD. Therefore, the second resource may be configured for the least used CCE from the available PDCCH resources. For example, the last CCEs, which are typically least used CCEs, may be configured for the second resource.

In addition, the Layer 3 may configure multiple UEs sharing the same second resource. However, the eNB may avoid resource overlapping via scheduling using time division multiplexing (TDM) among UEs.

For certain aspects, the second resource for SORTD and PDCCH level 1 may also come from the UL PDCCH for the same UE. For example, the starting CCE index of the UL PDCCH for scheduling transmissions in physical uplink shared channel (PUSCH) may be used for SORTD. It should be noted that this method may need concurrent DL and UL scheduling for a UE.

For certain aspects of the present disclosure, ACK/NAK repetition may be supported along with SORTD. Therefore, resources may be allocated for ACK/NAK repetition. For example, resources for the first transmission may be allocated similar to a non-repetition case for both dynamic and semi-persistent scheduling. In addition, resources for all the repetitions may be configured through layer 3 signaling.

Additionally, means for receiving may comprise any suitable receiving component such as the signal receiving component 902, or the downlink control channel receiving component 1001. Means for identifying a transmit diversity scheme may comprise a circuit or a processor capable of identifying a transmit diversity scheme, such as the transmit diversity scheme identifying component 1002. Means for determining may comprise a circuit or a processor capable of determining transmission parameters, such as the transmission parameter determining component 904, or control channel resource and aggregation level determining component 1004. Means for decoding may comprise a circuit or a processor capable of decoding a signal, such as the signal decoding component 906. Means for transmitting may comprise any suitable transmitting component, such as the downlink control channel transmitting component 908, or the signal transmitting component 1006.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
  selecting an aggregation level for use in transmitting a downlink control channel; and
  transmitting the downlink control channel to an apparatus using the selected aggregation level and one or more metrics dependent on the selected aggregation level and designed to ensure the apparatus decodes the downlink control channel with a proper aggregation level, wherein the one or more metrics comprise an aggregation level dependent starting index for control resources used to transmit the downlink control channel such that a first starting index is used for a first aggregation level and a second starting index is used for a plurality of other aggregation levels.

2. The method of claim 1, wherein the one or more metrics comprise an aggregation level dependent scrambling code applied when transmitting the downlink control channel.

3. The method of claim 2, wherein a different scrambling code is applied for each different aggregation level.

4. The method of claim 1, wherein the one or more metrics comprise an aggregation level dependent sequence used to scramble a cyclic redundancy check (CRC).

5. The method of claim 1, further comprising receiving signals from the apparatus transmitted using a transmission scheme.

6. The method of claim 5, wherein the transmission scheme is selected by the apparatus based on the aggregation level used to transmit the downlink control channel.

7. The method of claim 6, wherein the transmission scheme comprises a Spatial Orthogonal Resource Transmit Diversity (SORTD) scheme.

8. The method of claim 5, wherein the received signals are transmitted by the apparatus using one or more control channel resources mapped to one or more control channel resources of the downlink control channel.

9. The method of claim 5, wherein the received signals comprise one or more acknowledgement messages.

10. A method for wireless communications, comprising:
  receiving a downlink control channel transmitted using a selected aggregation level and one or more metrics dependent on the selected aggregation level and designed to ensure the downlink control channel is decoded with a proper aggregation level, wherein the one or more metrics comprise an aggregation level dependent starting index for control resources used to transmit the downlink control channel such that a first starting index is used for a first aggregation level and a second starting index is used for a plurality of other aggregation levels; and
  determining the selected aggregation level used to transmit the downlink control channel based on successful decoding of the downlink control channel using the one or more metrics dependent on the selected aggregation level.

11. The method of claim 10, wherein the one or more metrics comprise an aggregation level dependent scrambling code applied when transmitting the downlink control channel.

12. The method of claim 11, wherein a different scrambling code is applied for each different aggregation level.

13. The method of claim 10, wherein the one or more metrics comprise an aggregation level dependent sequence used to scramble a cyclic redundancy check (CRC).

14. The method of claim 10, further comprising transmitting signals to an apparatus that transmitted the downlink control channel using a transmission scheme.

15. The method of claim 14, wherein the transmission scheme is selected based on the aggregation level used to transmit the downlink control channel.

16. The method of claim 15, wherein the transmission scheme comprises Spatial Orthogonal Resource Transmit Diversity (SORTD) scheme.

17. The method of claim 14, wherein the signals are transmitted using one or more control channel resources mapped to one or more control channel resources used to transmit the downlink control channel.

18. The method of claim 14, wherein the transmitted signals comprise one or more acknowledgement messages.

* * * * *